_(12)_ United States Patent
Oh et al.

(10) Patent No.: US 7,180,505 B2
(45) Date of Patent: Feb. 20, 2007

(54) TOUCH PANEL FOR DISPLAY DEVICE

(75) Inventors: Eui Yeol Oh, Yongin-shi (KR); Hee Jung Hong, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 509 days.

(21) Appl. No.: 10/702,639

(22) Filed: Nov. 7, 2003

(65) Prior Publication Data

US 2004/0100452 A1   May 27, 2004

(30) Foreign Application Priority Data

Nov. 14, 2002   (KR) .................. 10-2002-0070793

(51) Int. Cl.
*G09G 5/00*   (2006.01)
(52) U.S. Cl. ..................................... 345/173
(58) Field of Classification Search ................ 345/173; 178/18.01–18.11, 19.01–19.07
See application file for complete search history.

(56) References Cited

U.S. PATENT DOCUMENTS

2002/0000979 A1* 1/2002 Furuhashi et al. .......... 345/173

FOREIGN PATENT DOCUMENTS

JP   7-334289   12/1995
KR   2002019671 A * 3/2002

* cited by examiner

*Primary Examiner*—Amr A. Awad
*Assistant Examiner*—Stephen G Sherman
(74) *Attorney, Agent, or Firm*—McKenna Long & Aldridge LLP

(57) ABSTRACT

A touch panel includes first and second substrates facing each other; first and second transparent electrodes on opposing surfaces of the first and second substrates; first and second metal electrodes on opposing vertical peripheral regions of the first transparent electrode; a third metal electrode arranged proximate a first horizontal peripheral portion of the first transparent electrode and electrically connected to the first or second metal electrode; a first dummy metal electrode arranged opposite the first horizontal peripheral portion of the first transparent electrode; fourth and fifth metal electrodes arranged on opposing horizontal peripheral portions of the second transparent electrode; a sixth metal electrode arranged proximate a first vertical peripheral portion of the second transparent electrode and electrically connected to the fourth or fifth metal electrode; and a second dummy metal electrode arranged opposite the first vertical peripheral portion of the second transparent electrode.

26 Claims, 6 Drawing Sheets

TOUCH PANEL FOR DISPLAY DEVICE

This application claims the benefit of the Korean Application No. P2002-70793 filed on Nov. 14, 2002, which is hereby incorporated by reference for all purposes as if fully set forth herein.

BACKGROUND OF THE INVENTION

1. Field of the Invention

The present invention relates to touch panels. More particularly the present invention relates to touch panels for display devices, wherein a substantially uniform gap between lower and upper substrates of the touch panel may be maintained.

2. Discussion of the Related Art

Touch panels have been developed as a means of efficiently interfacing with electronic devices via a display surface. For example, users may input desired information using a touch panel integrated with a display device while watching images displayed by the display device. Allowing users to input desired information to an electronic device via a display surface, touch panels substantially reduce or eliminate the need for other types of input devices (e.g., keyboards, mice, remote controllers, and the like). Currently, touch panels have been widely integrated with display surfaces of flat panel display devices such as liquid crystal display (LCD) devices, plasma display panel (PDP) devices, electroluminescence (EL) devices, and cathode ray tubes (CRTs).

Depending on the type of contact object used (e.g., a user's finger, a stylus, etc.), and on the manner in which the location of a contact point (i.e., the location where the contact object is operably proximate the touch panel) is determined, touch panels are generally classifiable as analog resistive-type, capacitive-type, electromagnetic (EM)-type, saw-type, and infrared-type touch panels.

Generally, analog resistive-type touch panels include an upper substrate supporting upper electrodes and a lower substrate supporting lower electrodes. The upper and lower substrates are attached to each other but spaced apart from each other by a predetermined distance. When a surface of the upper substrate is contacted by a contact object, an upper electrode formed on the upper substrate electrically contacts a lower electrode formed on the lower substrate. When the upper and lower electrodes electrically contact each other, a voltage, made variable by a resistance value or a capacitance value specific to the location of where the user touched the touch panel (i.e., the contact point), is then detected and outputted along with a location defined by coordinates of the contact point.

Generally, capacitive-type touch panels include a film having a transparent electrode formed on a display device such as an LCD panel, wherein a voltage is applied to each corner of the film and a uniform electric field is thereby generated within the transparent electrode. Coordinates of the contact point may be determined in accordance with a voltage drop generated when the user touches the touch panel via a contact object.

FIG. 1 illustrates a plan view of a related art touch panel for a display device. FIG. 2 illustrates a cross-sectional view taken along line I–I' of FIG. 1. FIG. 3 illustrates a cross-sectional view taken along line II–II' of FIG. 1. FIG. 4 illustrates a cross-sectional view taken along line III–III' of FIG. 1. FIG. 5A schematically illustrates an upper substrate of the related art touch panel shown in FIG. 1. FIG. 5B schematically illustrates a lower substrate of the related art touch panel shown in FIG. 1.

The related art touch panel shown in FIG. 1 can be used to input signals over a display surface of a display device (e.g., an LCD device). Referring to FIG. 1, the related art touch panel includes a viewing area V/A, corresponding to the display surface of the display device, and a dead space region 20, corresponding to a non-display region surrounding the viewing area V/A.

Referring to FIGS. 1 and 2, the related art touch panel includes rectangular upper and lower substrates 1 and 2 formed of a transparent material such as Polyethylene Terephtalate (PET) and bonded to each other via an insulating adhesive arranged in the dead space region 20. The insulating adhesive arranged in dead space region 20 ensures that the upper and lower substrates 1 and 2 are uniformly spaced apart from each other. First and second transparent electrodes 3 and 4, respectively, are formed over the entirety of the opposing surfaces of the upper and lower substrates 1 and 2, respectively. Next, metal electrodes (e.g., Ag paste) are formed in the dead space region 20.

More specifically, and while referring to FIG. 5A, first and second metal electrodes 5a and 5b, respectively, are formed in the dead space region 20 at left and right sides of the upper substrate 1 and are electrically connected to the first transparent electrode 3. A third metal electrode 5c is formed in the dead space region 20 at the upper or lower side of the upper substrate 1 and is electrically insulated from the first transparent electrode 3 by a first insulating layer 10a formed on the first transparent electrode 3. The third metal electrode 5c is, however, electrically connected to the second metal electrode 5b. The first and third metal electrodes 5a and 5c are electrically connected to an upper set of first and second signal lines, respectively, formed on a flexible printed circuit (FPC) 7 via a first conductive adhesive 8a while the second metal electrode 5b is connected to the upper second signal line within the FPC 7 via the third metal electrode 5c.

Referring to FIG. 5B, fourth and fifth metal electrodes 6a and 6b, respectively, are formed in the dead space region 20 at lower and upper sides of the lower substrate 2 and are electrically connected to the second transparent electrode 4. A sixth metal electrode 6c is formed in the dead space region at the left side of the lower substrate 2, is electrically insulated from the second transparent electrode 4 by a second insulating layer 10b formed on the second transparent electrode 4, and electrically connects the fourth and fifth metal electrodes 6a and 6b to a lower set of first and second signal lines, respectively, formed on a lower surface of the FPC 7. The sixth metal electrode 6c is electrically connected to the lower set of first and second signal lines via a second conductive adhesive 8b while the fourth and fifth metal electrodes 6a and 6b are connected to the lower set of first and second signal lines, respectively, via the sixth metal electrode 6c.

The upper and lower sets of first and second signal lines, arranged at upper and lower surfaces of the FPC 7, respectively, are connected to power source voltage source Vcc and a ground voltage source GND, respectively. Accordingly, the first and second transparent electrodes 3 and 4 are connected to Vcc and GND voltage sources via metal electrodes 5a–c and 6a–c, respectively.

As described above, the FPC 7 is electrically bonded to the first, third, and sixth metal electrodes 5a, 5c, and 6c, respectively, via the first and second conductive adhesives 8a and 8b, respectively, while the upper and lower substrates 1 and 2 are bonded to each other via an insulating adhesive 9, provided throughout the dead space region 20 except for a portion of the dead region occupied by the FPC 7.

To electrically connect the FPC 7 to the aforementioned metal electrodes, first and second conductive adhesives 8a and 8b are initially deposited on corresponding ones of the first, third, and sixth metal electrodes 5a, 5c, and 6c. Next, the insulating adhesive 9 is deposited within the dead space region 20, except for the portion of the dead space region occupied by the FPC 7. Subsequently, the portion of the FPC 7 that is to be electrically connected to the first, third, and sixth metal electrodes 5a, 5c, and 6c (e.g., the portions of the FPC 7 on which the first and second conductive adhesives 8a and 8b are formed) is heated to approximately 100° C. and pressed against the aforementioned metal electrodes. Accordingly, the FPC 7 can be electrically connected to the aforementioned metal electrodes. Upon electrically connecting the aforementioned metal electrodes to the FPC 7, the lower and upper substrates 1 and 2 become bonded to each other.

If, during operation of the related art touch panel described above, a predetermined portion of the upper substrate 1 is contacted with a contact object (e.g., a pen, a user's finger, etc.), the first and second transparent electrodes 3 and 4 electrically contact each other at a position corresponding to the location where the contact object contacted the upper substrate 1 (i.e., the contact point).

Accordingly, the power supply voltage Vcc and the ground voltage GND are applied to the right and left sides, respectively, of the first transparent electrode 3 via first, second, and third metal electrodes 5a–c connected to the upper set of the first and second signal lines formed on the upper surface of the FPC 7. Subsequently, a voltage, having a value made variable by a resistance or capacitance value specific to the contact point, is outputted via the second transparent electrode 4, the fourth, fifth, and sixth metal electrodes 6a–c, and the lower set of first and second signal lines formed on the lower surface of the FPC 7 such that an X-axis coordinate of the contact point is detected.

Next, the power supply voltage Vcc and the ground voltage GND are applied to the upper and lower sides, respectively, of the second transparent electrode 4 formed via the fourth, fifth, and sixth metal electrodes 6a–c connected to the lower set of the first and second signal liens formed on the lower surface of the FPC 7. Subsequently, a voltage value specific to the contact point is outputted to the first transparent electrode 3 and to the first, second, and third metal electrodes 5a–c of the upper substrate 1. Accordingly, a Y-axis coordinate of the contact point is detected.

Use of the aforementioned related art touch panel is disadvantageous, however, because it is difficult to uniformly maintain the distance to which the upper and lower substrates 1 and 2 are spaced apart from each other. Accordingly, the reliability with which the contact point is detected can be reduced due to the non-uniformly spaced-apart upper and lower substrates.

SUMMARY OF THE INVENTION

Accordingly, the present invention is directed to a touch panel for a display device that substantially obviates one or more of the problems due to limitations and disadvantages of the related art.

An advantage of the present invention provides a touch panel for a display device having a substantially uniform space maintained between bonded ones of upper and lower substrates, wherein reliability in contact point detection is improved due to the substantially uniform space.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a touch panel for a display device may, for example, include first and second substrates facing each other; first and second transparent electrodes arranged on opposing surfaces of respective ones of the first and second substrates; first and second metal electrodes arranged on first and second opposing vertical peripheral regions of the first transparent electrode; a third metal electrode arranged proximate a first horizontal peripheral portion of the first transparent electrode, wherein the third metal electrode is electrically connected to the first or second metal electrode and is does not directly contact the first transparent electrode; a first dummy metal electrode arranged proximate a second horizontal peripheral portion of the first transparent electrode opposing the first horizontal peripheral portion of the first transparent electrode; fourth and fifth metal electrodes arranged on first and second opposing horizontal peripheral portions of the second transparent electrode; a sixth metal electrode arranged proximate a first vertical peripheral portion of the second transparent electrode, wherein the sixth metal electrode is electrically connected to the fourth metal electrode and does not directly contact the second transparent electrode; and a second dummy metal electrode arranged proximate a second vertical peripheral portion of the second transparent electrode opposing the first vertical peripheral portion of the second transparent electrode.

In one aspect of the present invention, the first to sixth metal electrodes and the first and second dummy metal electrodes may be formed of the same material.

In another aspect of the present invention, the metal electrodes may be formed of a material such as silver.

In still another aspect of the present invention, the touch panel may include dot spacers arranged between the first and second substrates.

In yet another aspect of the present invention, the second and third metal electrodes may be bonded together via an electrically conductive adhesive.

In still a further aspect of the present invention, the fifth and sixth metal electrodes may be bonded together via an electrically conductive adhesive.

In yet another aspect of the present invention, the first and second substrates may be bonded to each other via an insulating adhesive arranged within a peripheral portion of the first and second substrates.

In still another aspect of the present invention, the touch panel may include a first set of signal lines bonded to predetermined ones of the first through third metal electrodes.

In another aspect of the present invention, the touch panel may include a second set of signal lines bonded to predetermined ones of the fourth through sixth metal electrodes.

In one aspect of the present invention, the metal electrodes may be bonded to respective ones of the signal lines via an electrically conductive adhesive.

In another aspect of the present invention, the first and second sets of signal lines may each include first and second signal lines, wherein the second and third metal electrodes may be electrically bonded to respective ones of the first set of first and second signal lines and wherein the fourth and fifth metal electrodes may be electrically bonded to respective ones of the second set of first and second signal lines.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Figure 1:
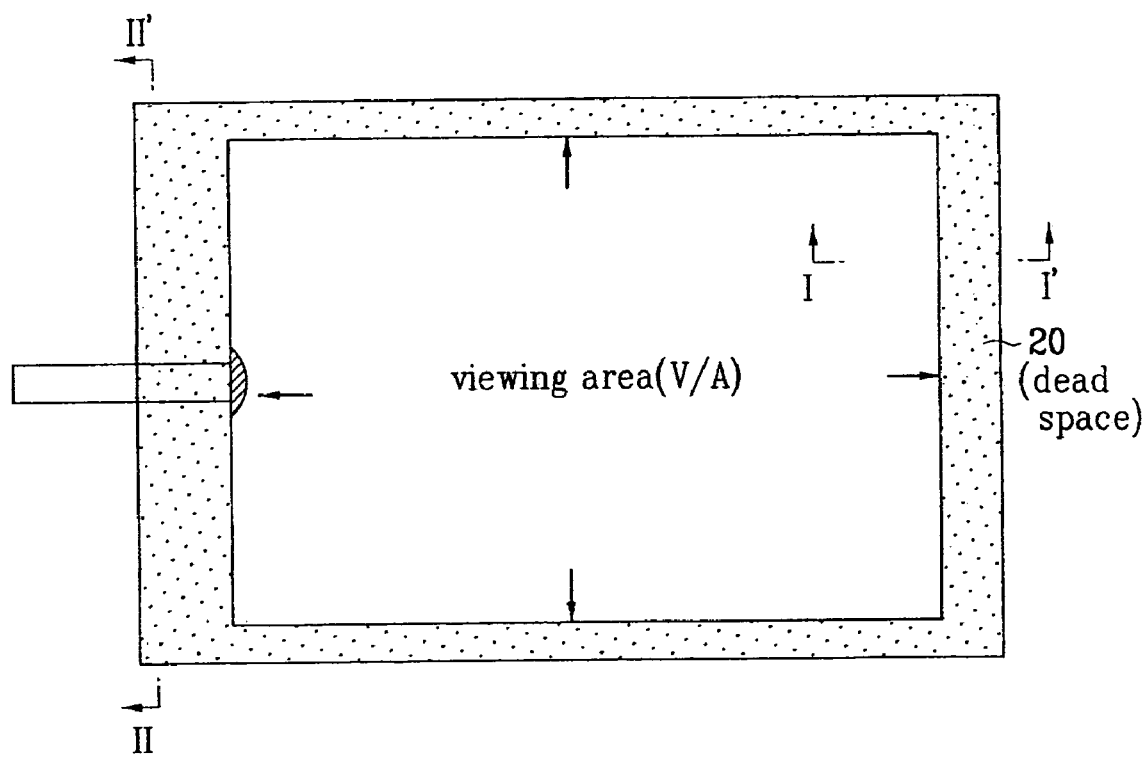
FIG. 1 illustrates a plan view of a related art touch panel for a display device.
Figure 2:
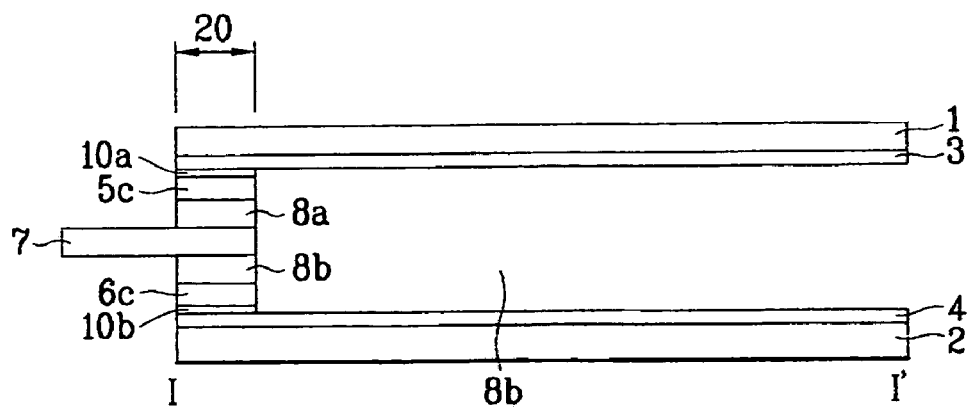
FIG. 2 illustrates a cross-sectional view taken along line I–I' of FIG. 1.
Figure 3:
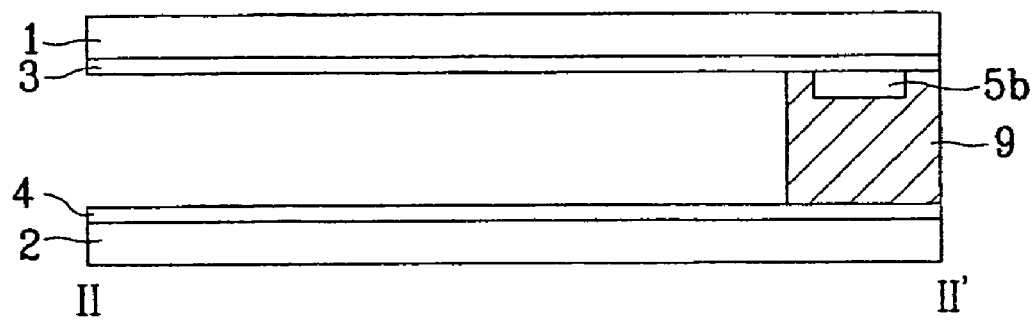
FIG. 3 illustrates a cross-sectional view taken along line II–II' of FIG. 1.
Figure 4:
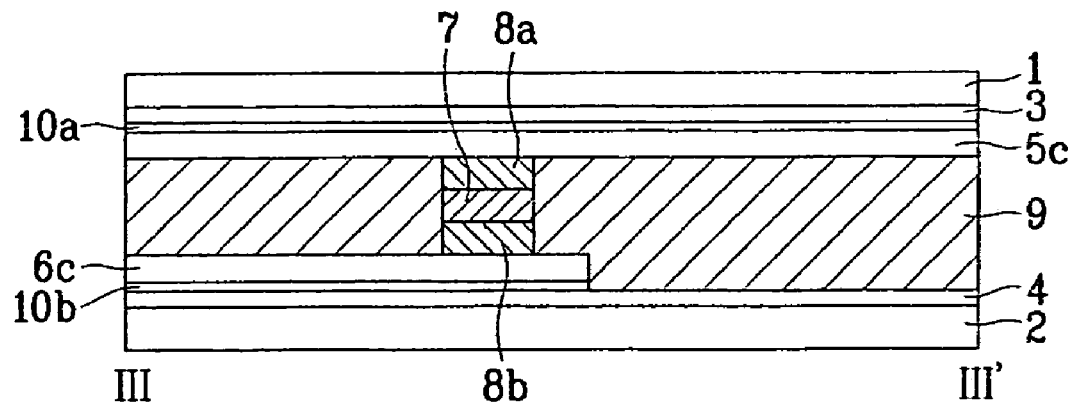
FIG. 4 illustrates a cross-sectional view taken along line III–III' of FIG. 1.
Figure 5A:
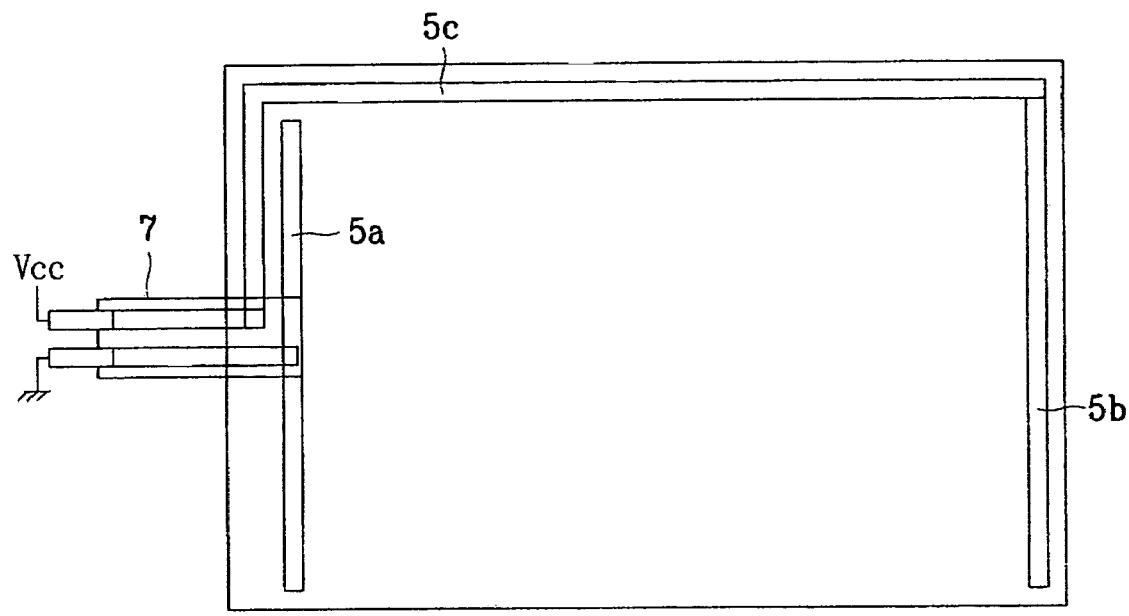
FIG. 5A schematically illustrates an upper substrate of the related art touch panel shown in FIG. 1.
Figure 5B:
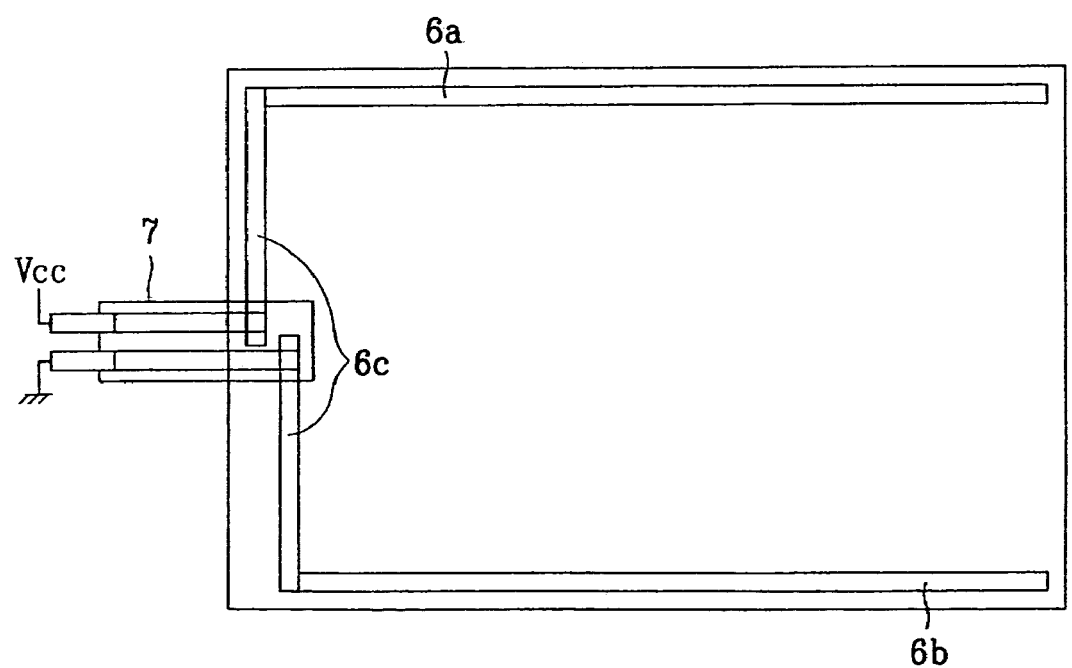
FIG. 5B schematically illustrates a lower substrate of the related art touch panel shown in FIG. 1.
Figure 6A:
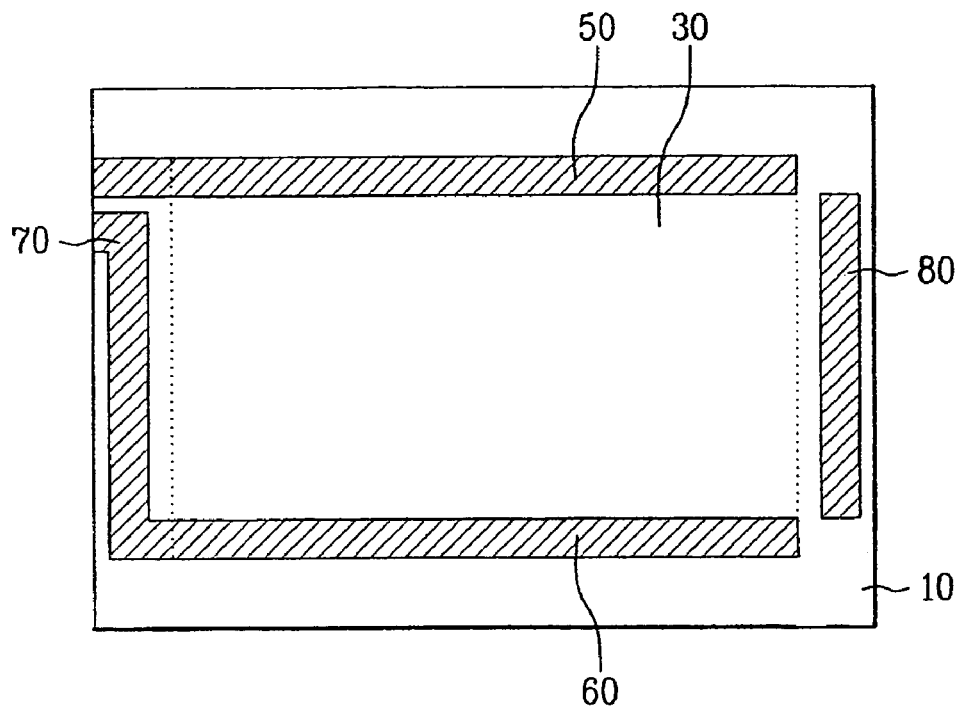
FIG. 6A schematically illustrates an upper substrate of a touch panel for a display device in accordance with principles of the present invention.
Figure 6B:
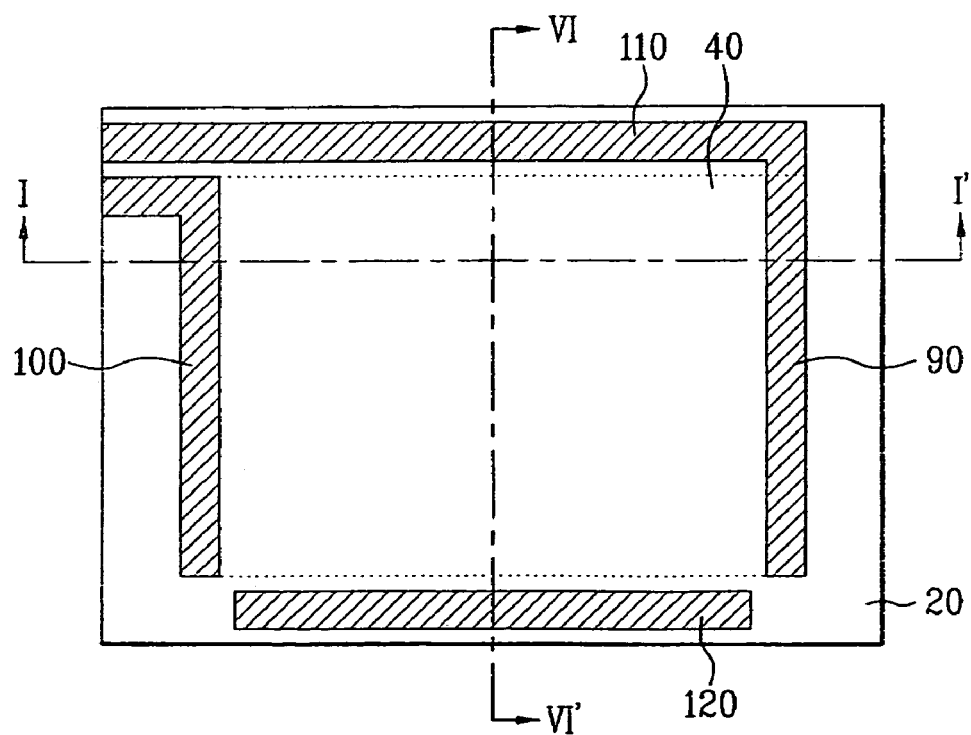
FIG. 6B schematically illustrates a lower substrate of a touch panel for a display device according to principles of the present invention.
Figure 7A:
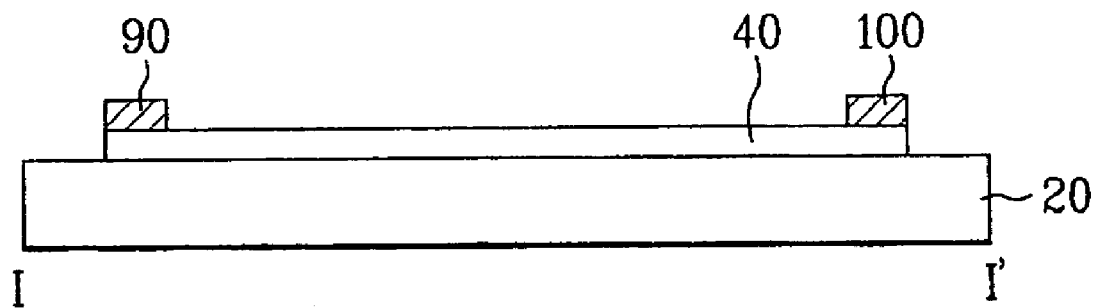
FIGS. 7A and 7B illustrate cross-sectional views taken along lines of I–I' of FIG. 6A and IV–IV' of FIG. 6B, respectively.
Figure 7B:
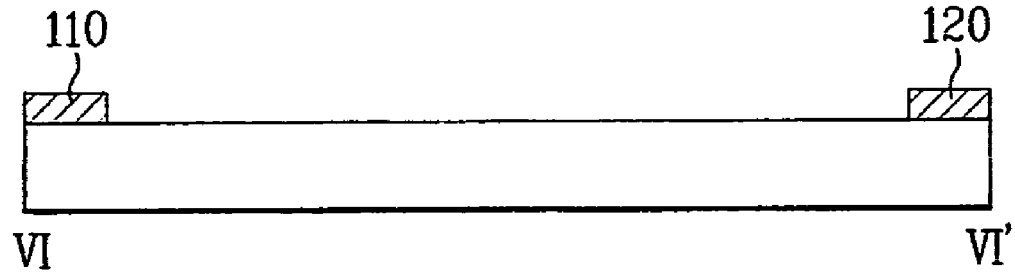

FIG. 6A schematically illustrates an upper substrate of a touch panel for a display device in accordance with principles of the present invention. FIG. 6B schematically illustrates a lower substrate of a touch panel for a display device according to principles of the present invention. FIGS. 7A and 7B illustrate cross-sectional views taken along lines of I–I' of FIG. 6A and IV–IV' of FIG. 6B, respectively.

Referring to FIGS. 6A and 6B, a touch panel for a display device may, for example, include an upper substrate 10 and a lower substrate 20. In one aspect of the present invention, the upper and lower substrates 10 and 20 may be formed of a transparent material such as Polyethylene Terephtalate (PET). According to principles of the present invention, first and second transparent electrodes 30 and 40 may be respectively formed on predetermined areas of the upper and lower substrates 10 and 20, respectively. In one aspect of the present invention, the first and second transparent electrodes 30 and 40 may be arranged within a viewing area of the touch panel. Accordingly, portions of the touch panel corresponding to a dead space (e.g., where an adhesive material is to be arranged) may lack the first and second transparent electrodes 30 and 40.

Referring specifically to FIG. 6A, first and second metal electrodes 50 and 60, respectively, may be arranged directly on first and second opposing vertical peripheral portions (e.g., upper and lower portions, respectively) of the first transparent electrode 30. Subsequently, a third metal electrode 70 may be arranged proximate a first horizontal peripheral portion (e.g., a left or right portion) of the first transparent electrode 30. Further, a first dummy metal electrode 80 may be arranged proximate a second horizontal peripheral portion (e.g., a right or left portion) of the first transparent electrode 30, opposing the first horizontal peripheral portion of the first transparent electrode 30. In one aspect of the present invention, the first and second metal electrodes 50 and 60, respectively, may be electrically connected to the first transparent electrode 30. In another aspect of the present invention, the third metal electrode 70 may be electrically connected the first metal electrode 50 or to the second metal electrode 60. In still another aspect of the present invention, the third metal electrode 70 may be not directly contact the first transparent electrode 30. In yet another aspect of the present invention, the first dummy metal electrode 80 may be electrically insulated from the first transparent electrode 30. In still a further aspect of the present invention the third metal electrode 70 may be formed directly on the upper substrate 10. In yet a further aspect of the present invention the first dummy metal electrode 80 may be formed directly on the upper substrate 10.

Referring specifically to FIG. 6B, fourth and fifth metal electrodes 90 and 100, respectively, may be arranged directly on first and second opposing horizontal peripheral portions (e.g., left and right portions, respectively) of the second transparent electrode 40. Subsequently, a sixth metal electrode 110 may be arranged proximate a first vertical peripheral portion (e.g., an upper or lower portion) of the second transparent electrode 40. Further, a second dummy metal electrode 120 may be arranged proximate a second vertical peripheral portion (e.g., a lower or upper portion) of the second transparent electrode 40, opposing the first vertical peripheral portion of the second transparent electrode 40. In one aspect of the present invention, the fourth and fifth metal electrodes 90 and 100 may be electrically connected to the second transparent electrode 40. In another aspect of the present invention, the sixth metal electrode 110 may be electrically connected to the fourth metal electrode 90 or to the fifth metal electrode 100. In still another aspect of the present invention, the sixth metal electrode 110 may not directly contact the second transparent electrode 40. In yet another aspect of the present invention, the second dummy metal electrode 120 may be electrically insulated from the second transparent electrode 40. In still a further aspect of the present invention the sixth metal electrode 110 may be formed directly on the lower substrate 20. In yet a further aspect of the present invention the second dummy metal electrode 120 may be formed directly on the lower substrate 20.

In one aspect of the present invention, the first to sixth metal electrodes 50, 60, 70, 90, 100, and 110, respectively, may be formed of the same material as first and second dummy metal electrodes 80 and 120. In another aspect of the present invention, the first to sixth metal electrodes 50, 60, 70, 90, 100, and 110, respectively, and the first and second dummy metal electrodes 80 and 120 may be formed of a material such as silver. In still another aspect of the present invention, the first and second transparent electrodes 30 and 40 may be formed of a material such as Indium-Tin-Oxide (ITO), Tin-Antimony-Oxide (TAO), or the like.

According to principles of the present invention, while they are electrically insulated from the first and second transparent electrodes 30 and 40 and the first to sixth metal electrodes 50, 60, 70, 90, 100 and 110, the first and second dummy metal electrodes 80 and 120 may compensate for a distance to which the upper and lower substrates 10 and 20 are separated. For example, the first and second dummy metal electrodes 80 and 120 may ensure that a distance between the topography on the upper and lower substrates 10 and 20 is substantially uniform within a dead space region where an adhesive material is to be formed. As a result, it may be possible to maintain a substantially uniform space between the upper and lower substrates 10 and 20 when the upper substrate 10 is bonded to the lower substrate 20.

FIGS. 7A and 7B illustrate cross-sectional views taken along lines of I–I' of FIG. 6A and IV–IV' of FIG. 6B, respectively.

Referring to FIG. 7A, the second transparent electrode 40 may be arranged on a predetermined portion of the lower substrate 20 while the fourth and fifth metal electrodes 90 and 100 may be arranged directly on first and second opposing horizontal peripheral portions (e.g., left and right portions) of the second transparent electrode 40.

Referring to FIG. 7B, the sixth metal electrode 110 may be arranged proximate a first vertical peripheral portion (e.g., an upper or lower portion) of the second transparent electrode 40, directly on the lower substrate 20, and electrically connected to either the fourth metal electrode 90 or the fifth metal electrode 100. Further, the second dummy metal electrode 120 may be arranged proximate a second vertical peripheral portion (e.g., a lower or upper portion) of the second transparent electrode 40, opposite the first vertical peripheral portion of the second transparent electrode 40, and directly on the lower substrate 20.

Figure 8:
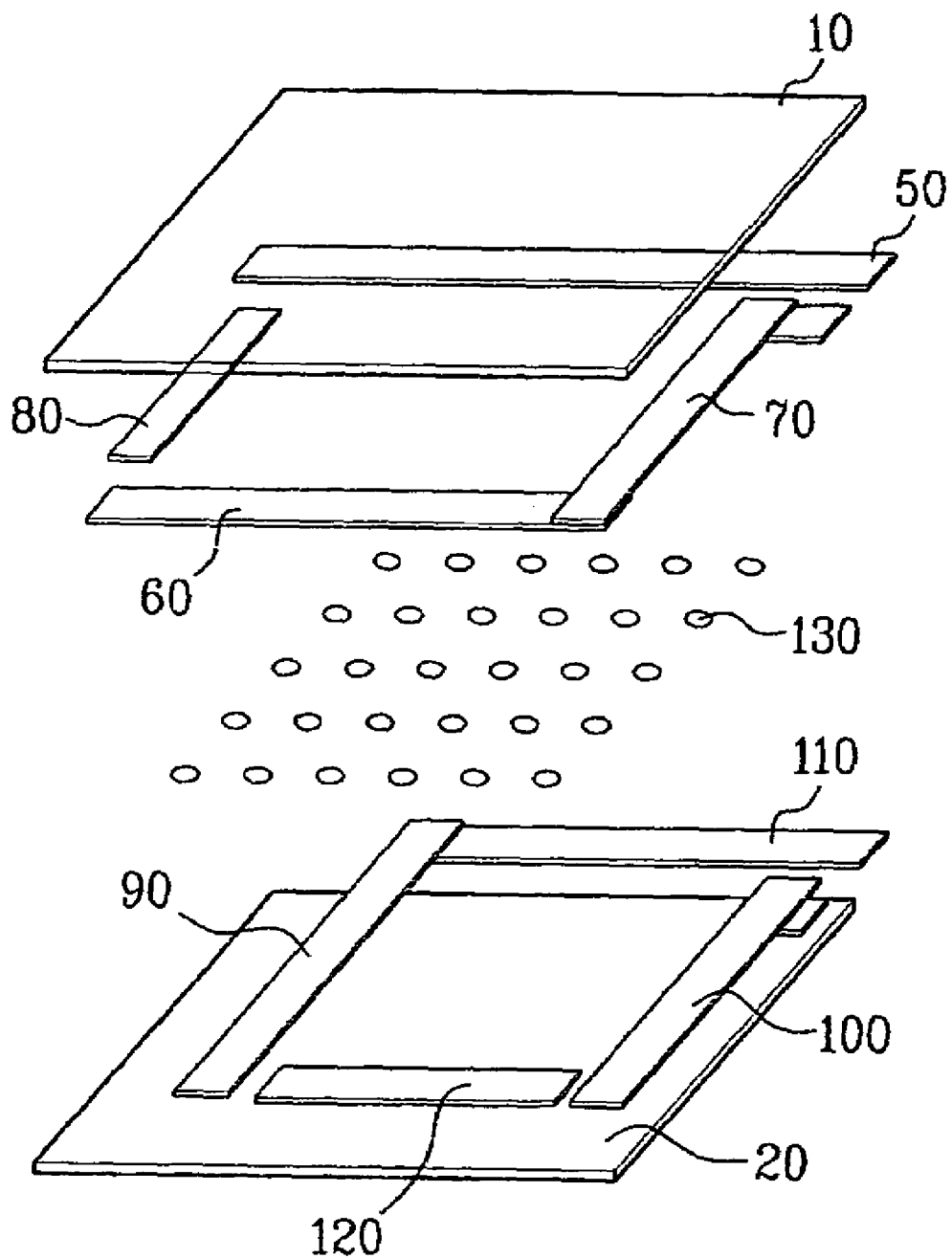
FIG. 8 illustrates a perspective view of a touch panel for a display device according to principles of the present invention.

FIG. 8 illustrates a perspective view of a touch panel for a display device according to principles of the present invention.

Referring to FIG. 8, the first and second metal electrodes 50 and 60 may be arranged at first and second vertical peripheral portions (e.g., upper and lower portions) of the upper substrate 10 while the third metal electrode 70 may be arranged at a first horizontal peripheral portion (e.g., a right portion) of the upper substrate 10. Further, the first dummy metal electrode 80 may be arranged at a second horizontal peripheral portion (e.g., a left portion) of the upper substrate 10, opposite the first horizontal peripheral portion of the upper substrate, to compensate for a distance between the upper and lower substrates. In one aspect of the present invention, the first and second metal electrodes 50 and 60 may be electrically connected to the transparent electrode formed on the upper substrate 10. In another aspect of the present invention, the third metal electrode 70 may be electrically connected to the second metal electrode 60. In still another aspect of the present invention, the third metal electrode 70 and the first dummy metal electrode 80 may not directly contact the transparent electrode formed on the upper substrate 10. In yet another aspect of the present invention, the third metal electrode 70 and the first dummy metal electrode 80 may be formed directly on the upper substrate 10.

Moreover, the fourth and fifth metal electrodes 90 and 100 may be arranged at first and second horizontal peripheral portions (e.g., left and right portions) of the lower substrate 20 while the sixth metal electrode 110 may be arranged at a first vertical peripheral portion (e.g., an upper portion) of the lower substrate 20. Further, the second dummy metal electrode 120 may be arranged at a second vertical peripheral portion (e.g., a lower portion) of the lower substrate 20, opposite the first vertical peripheral portion of the lower substrate, to compensate for a distance between the upper and lower substrates. In one aspect of the present invention, the fourth and fifth metal electrodes 90 and 100 may be electrically connected to the transparent electrode formed on the lower substrate 20. In another aspect of the present invention, the sixth metal electrode 110 may be electrically connected to the fourth metal electrode 90. In still another aspect of the present invention, the sixth metal electrode 110 and the second dummy metal electrode 120 may not directly contact the transparent electrode formed on the lower substrate 20. In yet another aspect of the present invention, the sixth metal electrode 110 and the second dummy metal electrode 120 may be formed directly on the lower substrate 20.

Upon bonding the upper substrate 10 to the lower substrate 20, a plurality of dot spacers 130 may, for example, be provided to uniformly maintain the space between the upper and lower substrates 10 and 20. In one aspect of the present invention, the dot spacers may be formed of an insulating material such as silicon nitride, silicon oxide, Benzocyclobutene (BCB), acrylic resin, or the like.

Although not shown in the Figure, an insulating adhesive may be provided at the in a dead space region at a periphery of the upper and lower substrates 10 and 20 to bond the upper and lower substrates 10 and 20 together.

According to principles of the present invention, either the first or second metal electrode 50 or 60 and third metal electrode 70, as well as either the fourth or fifth metal electrode 90 or 100 and sixth metal electrode 110, may be connected to signal lines within a Flexible Printed Cable (FPC) via a conductive adhesive. In one aspect of the present invention, the FPC enables the touch panel to communicate with external devices. In another aspect of the present invention, the FPC may include first and second sets of signal lines, wherein each of the first and second sets includes first and second signal lines.

Depending on whether the third metal electrode 60 is electrically connected to first or second metal electrodes 50 or 60, the first set of first and second signal lines may be respectively bonded to the second and third metal electrodes 60 and 70, respectively, or to the first and third metal electrodes 50 and 70, respectively. Similarly, depending on whether the sixth metal electrode 110 is electrically connected to the fourth or fifth metal electrodes 90 or 100, the second set of first and second signal lines may be respectively bonded to the fifth and sixth metal electrodes 100 and 110, respectively, or to the fourth and sixth metal electrodes 90 and 110, respectively.

Use of the touch panel described above in accordance with principles of the present invention is advantageous because dummy metal electrodes may be formed directly on portions of the substrate on which no transparent electrodes are formed. Accordingly, it is possible to maintain a substantially uniform space between the upper and lower substrates during bonding. By maintaining the substantially uniform space between the bonded upper and lower substrates, the reliability with which contact points may be detected, and their accuracy of the coordinates thus calculated, increases.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A touch panel for a display device comprising:
a first substrate;
a second substrate opposing the first substrate;
a first and second transparent electrodes arranged on opposing surfaces of the first and second substrates, respectively;
first and second metal electrodes arranged on first and second opposing vertical peripheral portions of the first transparent electrode;
a third metal electrode arranged proximate a first horizontal peripheral portion of the first transparent electrode;
a first dummy metal electrode arranged proximate a second horizontal peripheral portion of the first transparent electrode, opposite the first horizontal peripheral portion of the first transparent electrode;
fourth and fifth metal electrodes arranged on first and second opposing horizontal peripheral portions of the second transparent electrode;
a sixth metal electrode arranged proximate a first vertical peripheral portion of the second transparent electrodes; and
a second dummy metal electrode arranged proximate a second vertical peripheral portion of the second transparent electrode, opposite the first vertical peripheral portion of the second transparent electrode,
wherein the first dummy electrode and the second dummy electrode are each electrically insulated.

2. The touch panel of claim 1, wherein the third metal electrode is electrically connected to the first metal electrode.

3. The touch panel of claim 2, further comprising a conductive adhesive electrically bonding the first and third metal electrodes.

4. The touch panel of claim 1, wherein the third metal electrode is electrically connected to the second metal electrode.

5. The touch panel of claim 4, further comprising a conductive adhesive electrically bonding the second and third metal electrodes.

6. The touch panel of claim 1, wherein the sixth metal electrode is electrically connected to the fourth metal electrode.

7. The touch panel of claim 6, further comprising a conductive adhesive electrically bonding the fourth and sixth metal electrodes.

8. The touch panel of claim 1, wherein the sixth metal electrode is electrically connected to the fifth metal electrode.

9. The touch panel of claim 8, further comprising a conductive adhesive electrically bonding the fifth and sixth metal electrodes.

10. The touch panel of claim 1, wherein the third metal electrode is arranged directly on the first substrate.

11. The touch panel of claim 1, wherein the first dummy metal electrode is arranged directly on the first substrate.

12. The touch panel of claim 1, wherein the sixth metal electrode is arranged directly on the second substrate.

13. The touch panel of claim 1, wherein the second dummy metal electrode is arranged directly on the second substrate.

14. The touch panel of claim 1, wherein the first to sixth metal electrodes are formed of the same material as the first and second dummy metal electrodes.

15. The touch panel of claim 14, wherein the metal electrodes are formed of silver.

16. The touch panel of claim 1, further comprising a plurality of dot spacers arranged between the first and second substrates.

17. The touch panel of claim 1, further comprising an insulating adhesive arranged in a periphery bonding the first and second substrates to each other.

18. The touch panel of claim 1, further comprising a plurality of signal lines bonded to predetermined ones of the first through third metal electrodes and to predetermined ones of the fourth through sixth metal electrodes.

19. The touch panel of claim 18, further comprising a conductive adhesive bonding the predetermined ones of the metal electrodes to respective signal lines.

20. The touch panel of claim 19, further comprising an insulating adhesive bonding the first and second substrates to each other.

21. The touch panel of claim 18, wherein the plurality of signal lines comprises four signal lines; a first set of first and second signal lines are bonded to the predetermined ones of the first through third metal electrodes; a second set of first and second signal lines are bonded to the predetermined ones of the fourth through sixth metal electrodes.

22. The touch panel of claim 18, further comprising a flexible printed circuit (FPC) including the plurality of signal lines.

23. The touch panel of claim 1, wherein the first transparent electrode includes indium-tin-oxide.

24. The touch panel of claim 1, wherein the first transparent electrode includes tin-antimony-oxide.

25. The touch panel of claim 1, wherein the second transparent electrode includes indium-tin-oxide.

26. The touch panel of claim 1, wherein the second transparent electrode includes tin-antimony-oxide.

* * * * *